(12) United States Patent
Spies et al.

(10) Patent No.: US 9,091,026 B2
(45) Date of Patent: Jul. 28, 2015

(54) ARRANGEMENT OF A SUSPENSION AND A RAIL

(75) Inventors: Gerd Spies, Herdecke (DE); Stefan Fitzler, Iserlohn (DE); Sven Müller, Breckerfeld (DE)

(73) Assignee: Terex MHPS GmbH, Duesseldorf (DE)

( * ) Notice: Subject to any disclaimer, the term of this patent is extended or adjusted under 35 U.S.C. 154(b) by 0 days.

(21) Appl. No.: 13/820,020

(22) PCT Filed: Sep. 5, 2011

(86) PCT No.: PCT/EP2011/065331
§ 371 (c)(1),
(2), (4) Date: Feb. 28, 2013

(87) PCT Pub. No.: WO2012/034894
PCT Pub. Date: Mar. 22, 2012

(65) Prior Publication Data
US 2013/0153730 A1    Jun. 20, 2013

(30) Foreign Application Priority Data
Sep. 14, 2010    (DE) .......................... 10 2010 037 521

(51) Int. Cl.
*E01B 25/22*    (2006.01)
*E01B 25/24*    (2006.01)
(Continued)

(52) U.S. Cl.
CPC . *E01B 25/24* (2013.01); *B66C 7/02* (2013.01); *B66C 7/04* (2013.01); *B66C 7/08* (2013.01); *F16M 13/00* (2013.01)

(58) Field of Classification Search
CPC .............. B66C 7/14; B66C 7/08; B66C 7/02; H02G 5/04; E01B 25/24
USPC ................. 248/324, 341, 58, 222.13, 222.51, 248/222.52; 16/94 R, 96 R; 104/94, 106, 104/109, 89, 93; 105/155
See application file for complete search history.

(56) References Cited

U.S. PATENT DOCUMENTS

D47,724 S    8/1915    Heulings, Jr.
D47,725 S    8/1915    Heulings, Jr.
(Continued)

FOREIGN PATENT DOCUMENTS

CA    1203194 A1    4/1986
CH    429816    2/1967
(Continued)

OTHER PUBLICATIONS

International Search Report and Written Opinion of corresponding PCT Application PCT/EP2011/065331 mailed Dec. 12, 2011.
(Continued)

*Primary Examiner* — Anita M King
(74) *Attorney, Agent, or Firm* — Garder, Linn, Burkhart & Flory, LLP (57) ABSTRACT

An arrangement of a suspension and of a rail is provided, in particular for suspending a travel and/or carrier rail or a lifting gear on a chassis or frame, having a tension element supporting the rail at one end thereof in the region of a profile head by a mounting element, with the head being substantially C-shaped in cross section, and forming a gap running at the top along a longitudinal center plane of the rail. The mounting element comprises a pivotable part that can be pivoted with respect to the tension element, the profile head and the pivotable part being designed such that the pivotable part can be guided through the gap from outside into the profile head in a loading position, and can be pivoted into a mounting position in which the pivotable part contacts the profile head from the inside, bridging the gap.

19 Claims, 6 Drawing Sheets

(51) Int. Cl.
  *B66C 7/08*   (2006.01)
  *B66C 7/02*   (2006.01)
  *B66C 7/04*   (2006.01)
  *F16M 13/00*  (2006.01)

(56) References Cited

U.S. PATENT DOCUMENTS

| | | | |
|---|---|---|---|
| D158,461 S | 5/1950 | Hammerly | |
| D189,447 S | 12/1960 | Attwood | |
| 3,124,239 A | 3/1964 | Kornylak | |
| D200,099 S | 1/1965 | Attwood | |
| 3,183,480 A | 5/1965 | Alder, Jr. | |
| 3,452,501 A | 7/1969 | Zimmer et al. | |
| D238,510 S | 1/1976 | Tabler | |
| D238,777 S | 2/1976 | Rodney | |
| 3,974,777 A * | 8/1976 | Monne | 104/94 |
| 4,102,007 A * | 7/1978 | Janson | 16/94 R |
| 4,524,698 A | 6/1985 | Tourtellier et al. | |
| 4,768,442 A * | 9/1988 | Miller | 104/106 |
| D306,078 S | 2/1990 | Whitney | |
| 5,074,407 A | 12/1991 | Brumby | |
| 5,271,586 A * | 12/1993 | Schmidt | 248/58 |
| D346,260 S | 4/1994 | Silbersky et al. | |
| 5,400,717 A | 3/1995 | Hoehn | |
| 5,410,937 A * | 5/1995 | Okamoto et al. | 84/403 |
| 5,443,151 A | 8/1995 | Taylor | |
| 5,598,785 A | 2/1997 | Zaguroli, Jr. | |
| D381,176 S | 7/1997 | Patois et al. | |
| D384,470 S | 9/1997 | Kubsik et al. | |
| 5,704,571 A * | 1/1998 | Vargo | 248/58 |
| 6,196,133 B1 | 3/2001 | Fitzler et al. | |
| 6,283,038 B1 | 9/2001 | Mattila | |
| D456,585 S | 4/2002 | Sandstroem | |
| D464,783 S | 10/2002 | Abbestam | |
| D511,580 S | 11/2005 | Ryan et al. | |
| D515,266 S | 2/2006 | Moe | |
| 7,503,263 B2 | 3/2009 | Birkigt et al. | |
| 7,784,627 B2 * | 8/2010 | Birkigt et al. | 212/315 |
| 7,845,285 B2 | 12/2010 | Hast | |
| D650,143 S | 12/2011 | Bhosale et al. | |
| 8,104,731 B2 * | 1/2012 | Faucher et al. | 248/343 |
| D655,884 S | 3/2012 | Spies et al. | |
| 8,251,329 B2 * | 8/2012 | Suciu et al. | 248/316.2 |
| 8,464,478 B2 * | 6/2013 | Tweedie | 52/173.3 |
| 8,590,456 B2 | 11/2013 | Ipsen | |
| 2002/0079347 A1 | 6/2002 | Ezumi et al. | |
| 2005/0098059 A1 | 5/2005 | Wallner | |
| 2006/0137564 A1 | 6/2006 | Wallner | |
| 2008/0041806 A1 | 2/2008 | Birkigt et al. | |
| 2008/0230503 A1 | 9/2008 | Birkigt et al. | |
| 2010/0096438 A1 | 4/2010 | Sato et al. | |
| 2011/0191986 A1 * | 8/2011 | Smith | 16/87 R |
| 2013/0164078 A1 | 6/2013 | Spies et al. | |
| 2013/0167749 A1 | 7/2013 | Spies et al. | |
| 2013/0167750 A1 | 7/2013 | Spies et al. | |

FOREIGN PATENT DOCUMENTS

| | | |
|---|---|---|
| CN | 2386027 Y | 7/2000 |
| CN | 1312141 A | 9/2001 |
| CN | 1939834 A | 4/2007 |
| CN | 101595263 A | 12/2009 |
| CN | 101595264 A | 12/2009 |
| CN | 101641478 A | 2/2010 |
| DE | 914895 | 9/1954 |
| DE | 1249301 | 9/1967 |
| DE | 7346004 | 4/1974 |
| DE | 3211923 A1 | 10/1983 |
| DE | 3311362 C1 | 7/1984 |
| DE | 3329328 A1 | 2/1985 |
| DE | 3326103 | 3/1985 |
| DE | 4109051 | 9/1992 |
| DE | 9310593 | 9/1993 |
| DE | 29903470 | 9/1999 |
| DE | 10115565 A1 | 9/2002 |
| DE | 10337122 | 3/2005 |
| DE | 10337121 B3 | 6/2005 |
| DE | 102006058422 | 6/2008 |
| EP | 1031529 | 2/2000 |
| EP | 1205420 A1 | 11/2000 |
| EP | 1928777 B1 | 8/2006 |
| FR | 2201561 | 4/1974 |
| GB | 687367 | 2/1953 |
| GB | 1088878 | 10/1967 |
| GB | 2117337 A | 10/1983 |
| GB | 2137150 A | 10/1984 |
| GB | 2458135 A | 9/2009 |
| JP | 60-40614 U | 3/1985 |
| JP | 2000042759 | 2/2000 |
| JP | 3077974 U | 3/2001 |
| SE | 9200711 L | 9/1993 |

OTHER PUBLICATIONS

English translation of International Preliminary Report on Patentability from corresponding International Application PCT/EP2011/065331.

HB-System brochure by ABUS Kransysteme GmbH (Aug. 2009).

* cited by examiner

Fig. 1

ARRANGEMENT OF A SUSPENSION AND A RAIL

CROSS REFERENCE TO RELATED APPLICATIONS

The present application claims the priority benefits of International Patent Application No. PCT/EP2011/065331, filed on Sep. 5, 2011, and also of German Patent Application No. DE 10 2010 037 521.7, filed on Sep. 14, 2010, which are hereby incorporated herein by reference in their entireties.

BACKGROUND OF THE INVENTION

The invention relates to an arrangement of a suspension and of a rail, in particular for suspending a travel and/or carrier rail of a suspension track, a suspended conveyor or a lifting gear on a travelling mechanism or frame, having a tension element which supports the rail at one end in the region of a profile head by means of a mounting element, said head being substantially c-shaped in cross-section and forming at the top a gap extending along a longitudinal center plane of the rail.

European patent document EP 1 928 777 B1 discloses a device for suspending a rail which is used in particular for suspending a travel rail of a suspended conveyor or a lifting gear on a travelling mechanism or a frame. The device comprises a tension element which supports the rail at one end by means of a mounting element. The mounting element has a support element which widens and extends at least partially in the longitudinal direction of the rail and engages around a Y-shaped profile head of the rail from the outside in a clamping manner. The support element can be easily mounted at any location of the rail. For this purpose, mounting parts of the support element are assembled and clamped to the Y-shaped profile head by means of screws. The tension element comprises a lower bore for a bolt which is attached by means of the mounting element. The bolt has the lower bore extending therethrough and is mounted on the tension element via a ball-like joint, in particular via a spherical plain bearing. In the exemplified embodiment of FIGS. 11 to 13 a suspension is described in which the mounting element consists of a frame-shaped mounting part which is slid from one end into a T-shaped groove of the rail. Alternatively, provision is made that the mounting part is placed onto the rail head from the top and slot nuts attached to the mounting part then protrude from the top into the T-shaped groove and are then rotated by 90 degrees in order for the slot nuts to partially engage below the upper webs of the T-shaped groove.

Suspensions from Demag Cranes & Components GmbH are also known within the scope of their so-called KBK III system and can be inserted from the top into a longitudinal opening of a C-shaped profile head—which is open at the top—of a rail. For this purpose, a support plate of the suspension is rotated by 90 degrees, as it is inserted through the longitudinal opening, and is then rotated back by 90 degrees so that the ends of the support plate now engage, in the manner of a slot nut, behind web ends of the profile head which delimit the longitudinal opening. Then, the support plate is prevented from being rotated back and displaced in the longitudinal direction of the longitudinal opening by being screwed to an outwardly adjacent counter-plate. This type of suspension allows a free and retroactive attachment of the suspension to the rail without disassembling the rail.

SUMMARY OF THE INVENTION

The present invention creates an arrangement of a suspension and of a rail, in particular for suspending a travel and/or carrier rail of a suspension track, a suspended conveyor or a lifting gear on a travelling mechanism or frame, which combines simple assembly with a high level of security and high load-bearing capacity and which simultaneously allows free and retroactive positioning on the rail without disassembling the rail.

In accordance with an embodiment of the invention, in the case of an arrangement of a suspension and of a rail, in particular for suspending a travel and/or carrier rail of a suspension track, a suspended conveyor or a lifting gear on a travelling mechanism or frame, having a tension element which supports the rail at one end in the region of a profile head by means of a mounting element, said head being substantially c-shaped in cross-section and forming at the top a gap extending along a longitudinal center plane of the rail, an arrangement which combines simple assembly with a high level of security and high load-bearing capacity and simultaneously allows free and retroactive positioning on the rail without disassembling the rail is achieved by virtue of the fact that the mounting element comprises a pivotable part which can be pivoted with respect to the tension element, the profile head and the pivotable part are dimensioned such that the pivotable part can be inserted through the gap from the outside into the profile head in a pivoting position and can be pivoted into a mounting position in which the pivotable part lies against the profile head from the inside, bridging the gap. It is hereby achieved that the suspension can be pivoted in a corresponding rail through the gap in the hollow profile head in order to receive the pivotable part of the suspension. When the profile head and the suspension or its pivotable part are correspondingly dimensioned in a mutually adapted manner, the profile head is kept in a simple manner in the transverse direction by a positive-locking connection with the largest possible contact surface.

A considerable advantage resides in the fact that the suspension can now be preassembled before it is inserted into the rail. It does not have to be assembled in the rail which is difficult or impossible owing to the small amount of space available and a special tool would possibly be required for this purpose.

In addition, this type of suspension allows positioning at any location of the rail, even after assembly thereof.

In a preferred embodiment, the pivotable part is aligned substantially horizontally in the mounting position and is aligned substantially vertically in the pivoting position.

If the pivoting part is formed to be arc-shaped in cross-section, i.e., is bent upwards in a concave manner or like a banana, in particular upwards as seen in the suspension direction, it can securely engage behind the profile head in the mounting position.

The pivoting process is thus facilitated since the pivotable part is disposed so as to be pivotable about a bolt mounted in the tension element in the longitudinal direction of the rail.

A simple construction combined with angular mobility of the suspension is achieved by virtue of the fact that the bolt is attached to the tension element via a ball-like joint, in particular via a spherical plain bearing. The bolt can thus be connected directly with the mounting element and the installation height of the entire suspension is minimised. This direct connection increases the security of the suspension. The use of a spherical plain bearing allows long service lives to be achieved. The construction is simplified since spherical plain bearings which are produced in the industry, available on the market and are correspondingly low-wear can be used.

The term "spherical plain bearing" is understood to mean standardised radial spherical plain bearings e.g., in accordance with DIN ISO 12240 which are produced in the industry, available on the market and ready to install, wherein these radial spherical plain bearings are articulated and allow spatial adjustments. Spherical plain bearings are structural units which comprise an outer ring in which an inner ring is mounted. The inner ring comprises a cylindrical bore for the rotationally-fixed reception of a bolt, and a spherical outer slide way for forming the spherical head. This outer slide way is engaged with a hollow-spherical inner slide way of the outer ring whose cylindrical peripheral surface is inserted into a bore in a rotationally-fixed manner. The outer slide way and the inner slide way can each be formed of steel and be in direct correlation with each other. A lubricant supply is then additionally provided in most cases. For the present application, spherical plain bearings are used which comprise a sliding layer or a sliding ring e.g., of synthetic material or Teflon, between the inner and outer ring. This sliding ring is then attached to the outer ring and the inner ring slides in the sliding ring. In another construction, the outer ring can be omitted as a separate component and its function assumed by the tension element. The inner ring is inserted transversely into the widened bore in the tension element and is rotated by 90° in the bore to its operating position. Then, the widened area of the bore and the gap between the inner ring and the bore is filled with a synthetic material which hardens to form the sliding ring.

In a particular embodiment the suspension comprises a frame-like counter bearing which is formed to be arc-shaped in cross-section and is placed from the outside onto the profile head and is screwed with the pivotable part in the mounting position. The pivotable part is thus secured against displacement in the longitudinal direction of the rail and the pivotable part is also kept securely in the horizontal mounting position.

Since the profile head delimits the gap on both sides with first web sections which extend outwardly and upwardly and in an inclined manner from the longitudinal center plane, and the pivotable part engages into the crimps of the profile head thus formed by the first web sections, i.e., are disposed substantially in an approximate V-shaped manner and do not protrude back approximately horizontally in the direction of the vertical longitudinal center plane like in the Prior Art, they prevent the rail profile itself from bending in the event of extreme overloading. In the case of an overloading, there is thus actually an increase in the clamping effect on the pivotable part of the suspension disposed in the gap since the first web sections are "pushed" towards one another in the case of an overloading. This effect is increased by the arc-shaped formation of the pivotable part. This is important since in the case of an overloading, there can also be no failure in the connection between the rail or its head profile and the suspension or its connecting element. The particular geometry of the profile head of the rail in accordance with the invention ensures that the rail is not the weakest link in the chain.

Provision is advantageously made that the web sections extend at an angle of approximately 15 to 35 degrees relative to the longitudinal center plane. The pivotable part is held in this angular range in a particularly secure manner.

If the profile head comprises two opposing second web sections which extend downwardly and outwardly, as seen in cross-section, and which are attached to the first web sections, and also subsequently comprises third web sections protruding back inwardly in the direction of the vertical longitudinal center plane, which are attached to the second web sections, i.e., the profile head is wider at the base and narrows in the direction away from the profile body, a suspension can be used for the rail which can "pivot" through the gap into the hollow profile head since the diagonal extension (as seen in cross-section) is thus large enough in order to accommodate a pivotable part of a suspension which is then pivoted approximately horizontally and engages in a positive-locking manner into the crimps of the profile head formed by the first web sections. When the profile head and the suspension or its pivotable part are correspondingly dimensioned in a mutually adapted manner, the profile head is thus kept in a simple manner in the transverse direction by a positive-locking connection.

The arrangement in accordance with the invention consisting of a suspension and rail can be used in a variety of ways, and in particular as a running rail and/or carrier rail for single-beam or double-beam suspension cranes.

Further details, features and advantages of the invention will become apparent from the following description of an exemplified embodiment with reference to the drawings.

DESCRIPTION OF THE PREFERRED EMBODIMENTS

Figure 1:
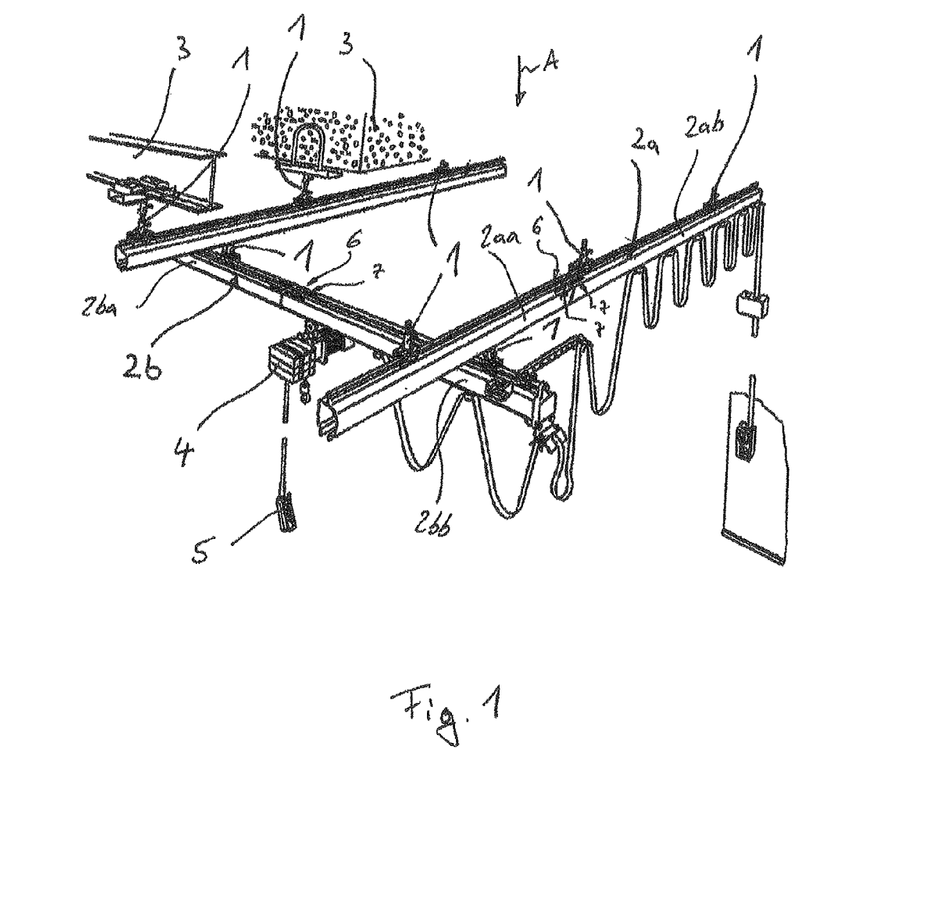
FIG. 1 shows a perspective and schematic view of a single-beam suspension crane in accordance with the Prior Art for illustrating the possible applications of corresponding rails.

In order to illustrate the very different ways of using connected rail sections to form rails, a single-beam suspension crane is illustrated in FIG. 1.

By means of suspension devices 1, rails 2, which extend substantially horizontally and are profiled in a c-shaped manner open at the bottom, are suspended on support elements 3 or further rails 2. The support elements 2 are formed as double-T beams. Since the present exemplified embodiment relates to a single-beam suspension crane, two first rails 2a are provided which extend substantially horizontally and in parallel with and at a spaced disposition with respect to each other and are used as travel rails of the single-beam suspension crane, and a second rail 2b is provided which forms a crane rail which is aligned substantially transversely with respect to the first rails 2a and can be displaced along the first rails 2a. In this respect, the second rail 2b is suspended via two suspension devices 1 in each case on a travelling mechanism which is not illustrated and can be displaced along the first rails 2a. Suspended on the second rail 2b in a conventional manner is a lifting gear 4 such as a chain or cable hoist, which can be displaced along the second rail 2b by means of a further travelling mechanism, not shown. The lifting gear 4 can be controlled via a suspended switch 5 which is suspended on a lifting gear 4.

The rails 2a, 2b can thus be used selectively as crane track rails or carrier rails.

A rail 2 in accordance with the invention or a first suspension will now be described with reference to FIGS. 2 to 5.

The rails 2a and 2b each consist of two or more rail sections 2aa and 2ab or 2ba and 2bb respectively depending upon the length requirement.

The rail sections 2aa and 2ab or 2ba and 2bb are connected together via end-side butt joints 6.

Figure 2:
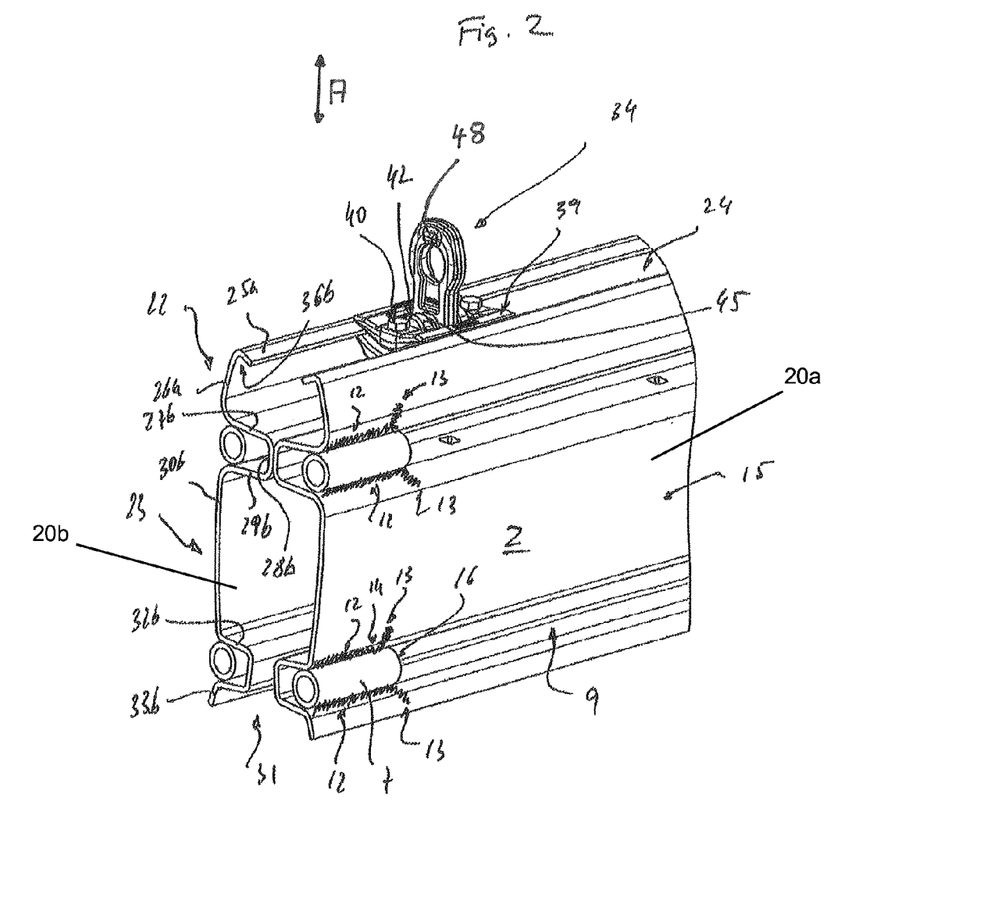
FIG. 2 shows a perspective view of a rail in accordance with the invention.
Figure 3:
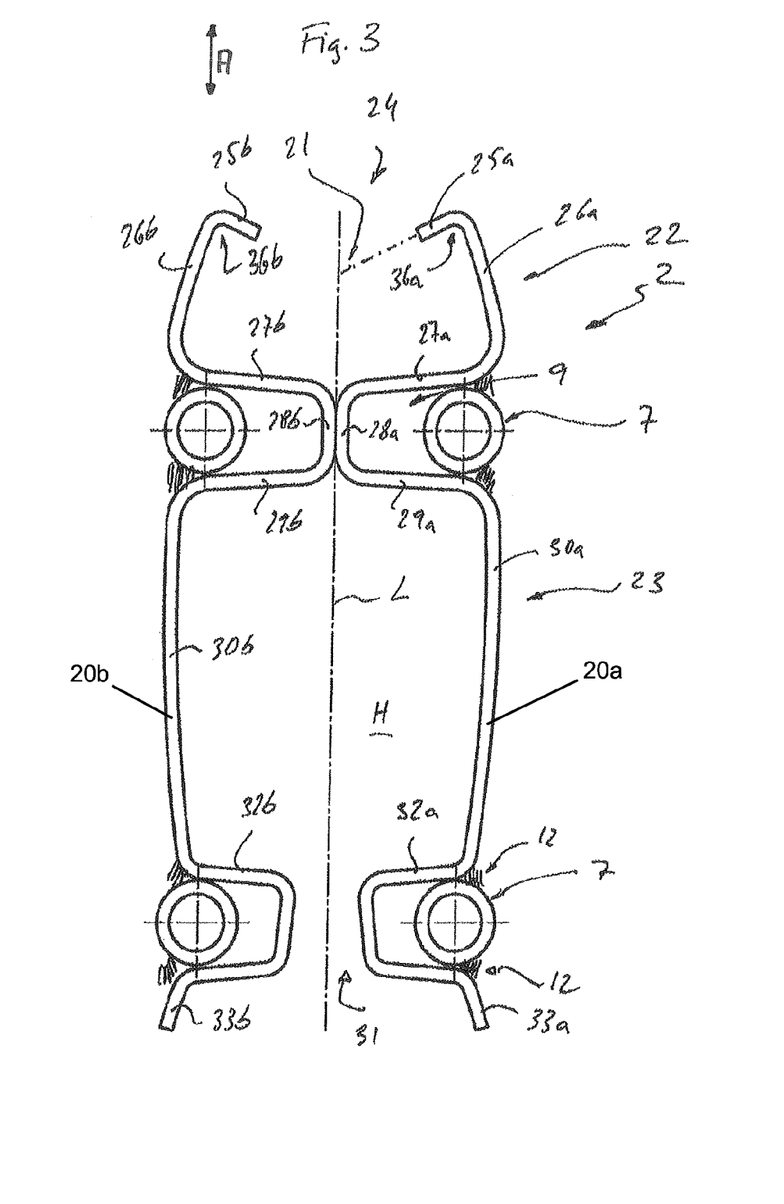
FIG. 3 shows a cross-section through the rail of FIG. 2.

By way of example, only the butt joint 6 of the rail sections 2aa and 2ab will be explained hereinafter with reference to FIGS. 2 and 3 since the butt joint of the rail sections 2ba and 2bb is formed in a corresponding manner. The profile of the rail sections of FIGS. 2 and 3 is merely similar, but not identical, to that of FIG. 1.

In order to form the butt joints 6 of the rail sections 2aa and 2ab, the rail sections 2aa and 2ab comprise in each case at their outer sides mounting elements formed as sleeves 7 which are disposed on the rail section ends 8 in longitudinally extending angular spaces or grooves 9 of the rail sections 2aa and 2ab.

In the illustrated example, four sleeves 7 are used for each rail section and are disposed in each case in corresponding longitudinal grooves 9. Two sleeves 7 are thus provided in each case for each rail section longitudinal side.

Stud bolts engage through the sleeves 7 as connection elements and the sleeves form for the heads or nuts thereof a bearing surface 16 extending transversely with respect to the longitudinal direction of the rail sections as a counter bearing surface.

The sleeves 7 are attached to the rail sections 2aa and 2ab in each case by a weld seam 12, extending in the longitudinal direction of the rail section 2aa and 2ab, on each of the two longitudinal sides of the sleeves 7. The weld seams 12 do not have to extend over the entire length of the sleeves 7 and can be formed differently from one another.

The end 13 of the weld seam 12 remote from the end-side deviates form the longitudinal direction. The end 13 thus forms an angle 14 with respect to the rest of the weld seam 12 and extends from the groove 9 to the lateral surface 15 of the rail profile or the continued profile wall.

In cross-section, the rail 2 consists of two identical profiles 20a, 20b disposed symmetrically with respect to the vertical longitudinal center plane L.

The rail comprises a profile head 22 which is disposed relatively along the longitudinal center plane L at the top, and a profile body 23 which is located beneath the profile head and is connected thereto.

As seen in cross-section, the profile head 22 is a substantially C-shaped profile head open at the top, whose opening forms a gap 24 extending along the longitudinal center plane L, said gap being delimited on both sides by first web sections 25a, 25b which extend outwardly and simultaneously upwardly in an inclined manner from the longitudinal center plane L.

The angle 21 of the web sections 25a, 25b is approximately 25 degrees relative to the longitudinal center plane L.

In cross-section, the profile head 22 further comprises two opposing second web sections 26a, 26b which extend downwardly and outwardly and are attached to the first web sections 25a, 25b, and the profile head also finally comprises third web sections 27a, 27b which protrude back inwardly in the direction of the vertical longitudinal center plane L and are attached to the second web sections 26a, 26b.

In other words, the profile head 22 is wider at its base and narrows in the directions away from the profile body 23. Therefore, a suspension 34 can be used for the rail 2 which can "pivot" through the gap 24 into the hollow profile head 22 (cf. FIGS. 4 and 5) since the diagonal extension (as seen in cross-section) is thus large enough in order to accommodate a pivotable part 35 of the suspension 34 which is then pivoted approximately horizontally and engages in a positive-locking manner into the crimps 36a, 36b of the profile head 22 formed by the first web sections 25a, 25b. When the profile head 22 and the suspension 23 or its pivotable part 25 are correspondingly dimensioned in a mutually adapted manner, the profile head 22 is thus kept in a simple manner in the transverse direction by a positive-locking connection.

Figure 4:
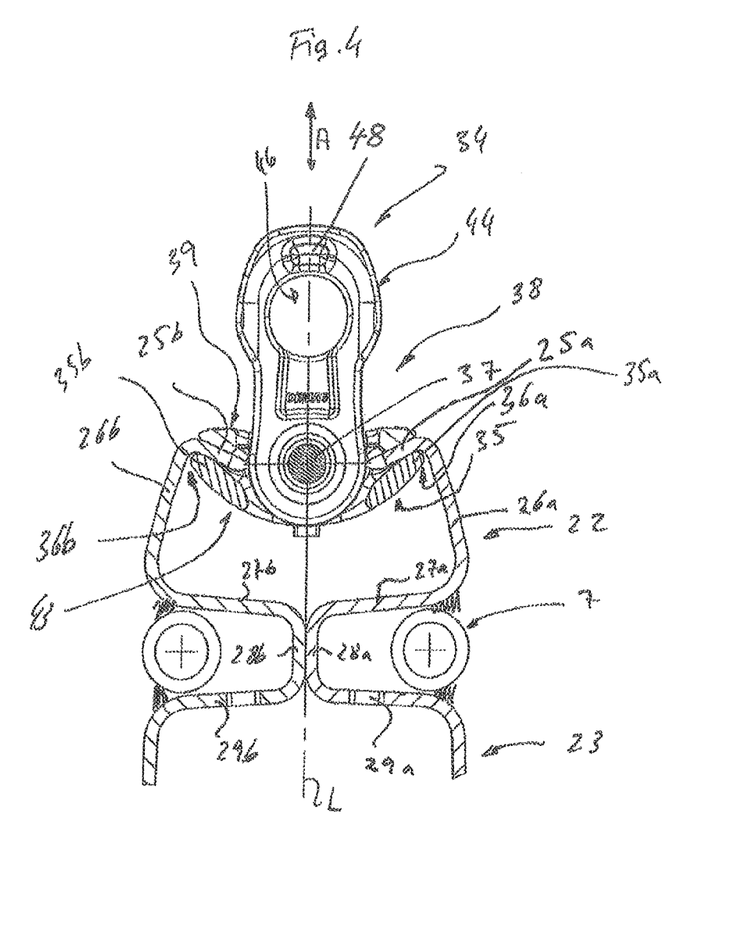
FIG. 4 shows a cross-section through the rail of FIG. 2 in the region of the suspension of the profile head; and also
Figure 5:
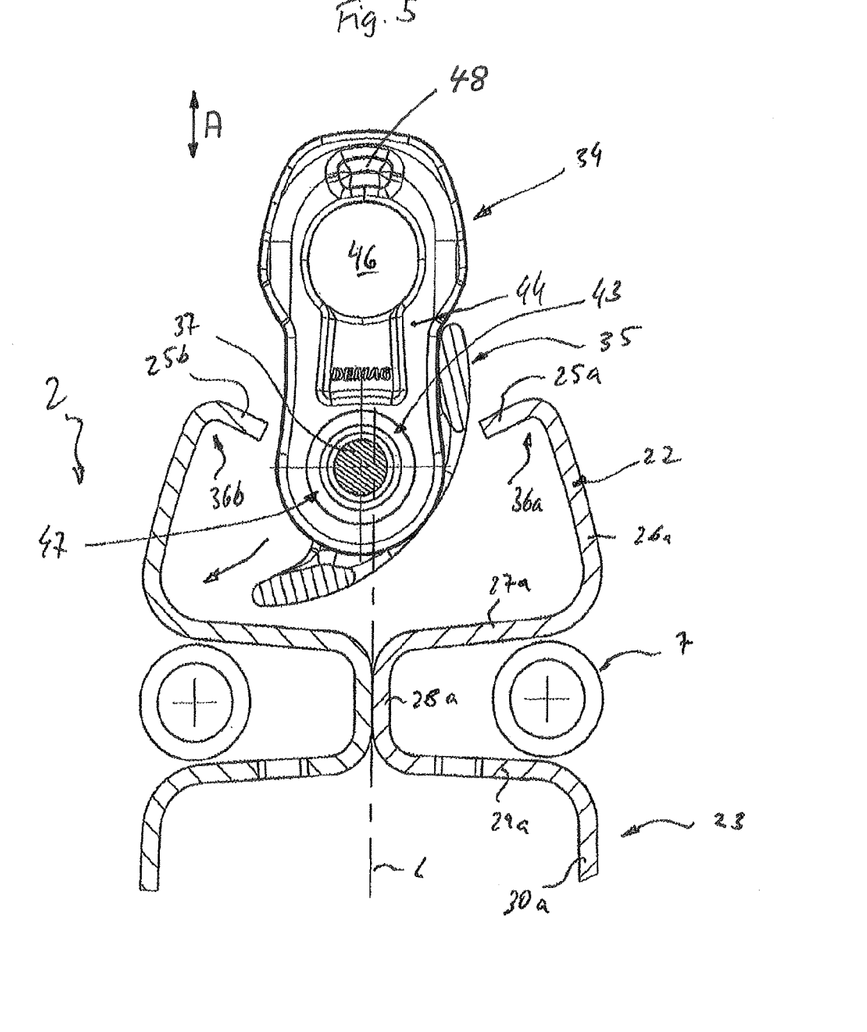
FIG. 5 shows the cross-section of FIG. 4 with the suspension being inserted.

Alternatively, the height of the profile head 22 would have to turn out to be considerably greater and the rail 2 could be formed as a whole in a less compact and rigid manner.

In order to attach and fix the suspension 34 on the profile head 22, initially the mentioned pivotable part 35 is pivoted to lie on one side approximately perpendicularly on the suspension so that it can be inserted with the other side into the gap 24.

Then the suspension 34 is slid with the pivotable part 35 in an inclined manner into one of the lower corners of the profile head 22 which are formed by the web sections 26a, 27a or 26b, 27b.

It is then possible to insert the other end of the pivotable part 35 past the web section 25a or 25b into the gap 24 and finally to pivot the pivotable part horizontally and insert it into the crimps 36a, 36b. In order for the pivotable part 35 to engage with its ends 35a, 35b into the crimps 36a, 36b, or to lie against them, in a positive-locking manner it is formed in an arc-shaped manner as seen in cross-section (FIGS. 4 and 5).

The suspension 34 thus already supports the rail 2 via the pivotable part 35 without the need for a screw-connection etc. Therefore, the entire loading can be absorbed by the pivot bolt 37 of the suspension which can be dimensioned to be substantially more capable of absorbing loads than a normal stud bolt of a clamping connection from the Prior Art.

In addition to the pivotable part 35, the mounting element 38 consists of a frame-like counter bearing 39 which is also arc-shaped. In order to fix the pivotable part 35 at a desired location in the longitudinal direction of the rail 2, the pivotable part 35 is pushed upwards via screws 40 and is thus supported on the lower side of the web sections 25a, 25b or crimps 36a, 36b. The screws 40 are supported on the upper side of the web sections 25a, 25b on the counter bearing 39. Therefore, the mounting element 38 is fixedly clamped on the web sections 25a, 25b. If the screws 40 become defective, the rail 2 is still retained via the pivotable part 35.

The pivotable part 35 can be divided into a mounting region 41 and a suspension region 42 attached thereto. The suspension region 42 consists substantially of two bores for receiving the bolt 37 which are spaced apart via an intermediate space into which a spherical plain bearing 43 with the tension element 44 is received. The intermediate space also comprises inwardly protruding protrusions in order to center the spherical plain bearing. The bolt 37 extending through the two bores and the spherical plain bearing 43 comprises at its end a head which is prevented from rotating via a cut-out in the counter bearing 39 and is kept in the bore. In the region of the bores, the pivotable part 35 is formed to be thicker towards the top in the manner of bearing blocks 45. This bearing blocks 45 protrude upwardly from the gap 24 and form the actual receptacles for the bolt 37.

The tension element 44 is formed as a flat bracket in the manner of a connecting rod or in a strip-like manner and is aligned approximately perpendicularly with respect to the longitudinal direction of the rail 2. This tension element 44 comprises an upper bore 46 and a lower bore 47. The tension element 44 is suspended on a travelling mechanism or beam via a hook, grommet, etc. The upper bore 46 comprises a knife edge bearing, i.e., the bore 46 is formed in a spherical manner and the bolt is guided in an angularly mobile and punctiform manner on the knife edge formed by the sphericity. Alternatively, a spherical plain bearing can be disposed in the upper bore.

The lower bore 47 is used for the suspension of the rail 2 on the tension element 44. For this purpose, the spherical plain bearing 43 is inserted in the lower bore 47 and the bolt 37 is guided through the bore of the spherical plain bearing. The ends of the bolt 37 protruding in the respective longitudinal direction of the rail 2 beyond the tension element 44 or the spherical plain bearing 43 engage into the bearing blocks 45 and are held so as to be rotationally-fixed in bores therein.

The tension element 44 comprises on both sides of the upper bore 46 a lug 48 so that the tension element 44 on the travelling mechanism, beam etc. does not dangle in the hook, grommet, etc. in spite of the slim construction.

In addition, fourth web sections 28a, 28b extending approximately along the longitudinal center plane L are provided on the profile head 22 and are attached to the third web sections 27a, 27b and connect the profile head 22 to the profile body 23 via its upper profile walls 29a, 29b.

The fourth web sections 28a, 28b of the profile head 22 lie against one another and are welded together at that location. The profiles 20a, 20b are thus connected to form the rail 2.

A hollow space H for travelling mechanisms is formed by the profile body 23 with upper profile walls 29a, 29b which extend in a substantially horizontal manner and profile sidewalls 30a, 30b extending downwardly in a slightly inclined manner with respect to the longitudinal center plane L as well as two lower profile walls 32a, b located on both sides of a lower slot 31 and being slightly inclined downwards with respect thereto, wherein lower profile walls 32a, 32b form a running surface for the corresponding wheels. In addition, a contact line can be disposed in the region of the upper profile walls 29a, 29b.

The lower profile wall 32a, 32b on the slot 31 continues substantially downwards and then inclined outwards and finally inclined downwards. The thus produced end sections 33a, 33b of the lower profile wall 32a, 32b allow the passage of the weld seam 12, as discussed above.

The angle of the end sections 33a, 33b of the lower profile wall 32a, 32b is approximately 110 degrees relative to the horizontal.

Figure 6:
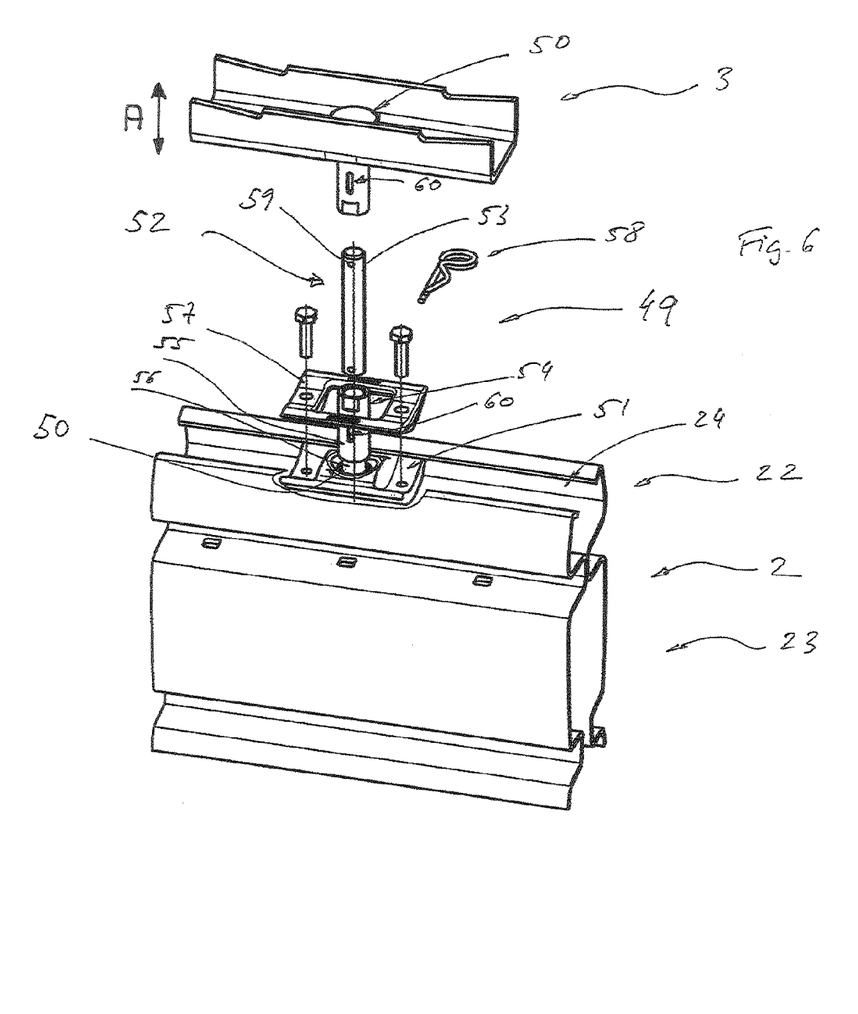
FIG. 6 shows a perspective exploded view of an alternative configuration of the suspension on a rail corresponding to FIG. 2.

FIG. 6 illustrates a perspective exploded view of an alternative configuration of the suspension on a rail corresponding to FIG. 2, which means that there is no need to again describe the rail 2. Only the particular features of the alternative suspension 49 will be described hereinafter.

In the illustrated alternative, the suspension 49 is attached by means of a ball and socket joint 50 on the rail 2 or the frame 3.

In order to receive the spherical head 50, the pivotable part 51 forms a ball socket having a central opening for the passage of the tension element 52. The pivotable part 51 can be pivoted about the spherical head 50 instead of the bolt 37 of the above embodiment.

The tension element 52 is formed in a rod-like manner and includes three parts, namely a threaded rod 53 disposed in the center and at the top and bottom a threaded sleeve 54 having an integrally connected spherical head 50. In order to improve pivotability, the threaded sleeve 54 comprises a cylindrical region 56 having a smaller diameter between the actual sleeve part 55 and the spherical head 50.

The pivotable part 51 is pivoted or inserted into the profile head 22 in a similar manner to the above embodiment. Then, the suspension 49 is fixed to a counter bearing 57, which is correspondingly frame-like and is likewise arc-shaped, in the longitudinal direction of the rail 2 at the gap 24.

Thereafter, the threaded rod 53 can be rotated in the threaded sleeve 54 and be prevented from rotating and secured against loss by means of a securing pin 58.

For this purpose, the threaded rod 53 comprises in each case in the upper and lower regions a through-going bore 59 and the threaded sleeves 54 comprise corresponding elongate holes 60.

LIST OF REFERENCE NUMERALS

1 Suspension device
2 Rail
2aa, 2ab, 2ba, 2bb Rail section
3 Support elements
4 Lifting gear
5 Suspended switch
6 Butt joint
7 Sleeve
8 Rail section end
9 Groove
12 Weld seam
13 End of the weld seam
14 Angle
15 Lateral surface
16 Bearing surface
20a, 20b Profile
21 Angle
22 Profile head
23 Profile body
24 Gap
25a, 25b First web section
26a, 26b Second web section
27a, 27b Third web section
28a, 28b Fourth web section
29a, 29b Upper profile wall
30a, 30b Profile sidewall
31 Slot
32a, 32b Lower profile wall
33a, 33b End section
34 Suspension
36a, 36b Crimp
35 Pivotable part
37 Pivot bolt
38 Mounting element
39 Counter bearing
40 Screws
41 Mounting region
42 Suspension region
43 Spherical plain bearing
44 Tension element
45 Bearing block
46 Bore
47 Bore
48 Lug
49 Suspension
50 Spherical head
51 Pivotable part
52 Tension element
53 Threaded rod
54 Threaded sleeve
55 Sleeve part
56 Region having a smaller diameter
57 Counter bearing
58 Securing pin
59 Bore
60 Elongate hole
A Suspension direction H Hollow space
L Longitudinal center plane

The invention claimed is:

1. Arrangement of a suspension and of a rail, in particular for suspending a travel and/or carrier rail of a suspension track, a suspended conveyor or a lifting gear on a travelling mechanism or frame, having a tension element which supports the rail at one end in the region of a profile head by means of a mounting element, said head being substantially c-shaped in cross-section and forming at the top a gap extending along a longitudinal center plane of the rail, wherein the mounting element comprises a pivotable part which can be pivoted with respect to the tension element, the profile head and the pivotable part are dimensioned such that the pivotable part can be inserted through the gap from the outside into the profile head in a pivoting position and can be pivoted into a mounting position in which the pivotable part lies against the profile head from the inside, bridging the gap, wherein the pivotable part is aligned substantially horizontally in the mounting position and is aligned substantially vertically in the pivoting position.

2. Arrangement as claimed in claim 1, wherein the pivotable part is formed to be arc-shaped in cross-section.

3. Arrangement as claimed in claim 2, wherein the pivotable part is disposed so as to be pivotable about a bolt mounted in the tension element in the longitudinal direction of the rail.

4. Arrangement as claimed in claim 3, wherein the bolt is attached to the tension element via a ball joint.

5. Arrangement as claimed claim 2, wherein the suspension comprises a frame-shaped counter bearing which is formed to be arc-shaped in cross-section and is placed from the outside onto the profile head and is screwed to the pivotable part in the mounting position.

6. Arrangement as claimed in claim 5, wherein the profile head comprises two opposing second web sections which extend downwardly and outwardly as seen in cross-section and which are attached to the first web sections, and comprises third web sections protruding back inwardly in the direction of the vertical longitudinal center plane, which are attached to the second web sections.

7. Arrangement as claimed claim 2, wherein the profile head delimits the gap on both sides with first web sections which extend outwardly and upwardly in an inclined manner from the longitudinal center plane, and the pivotable part engages into the crimps of the profile head thus formed by the first web sections.

8. Arrangement as claimed in claim 1, wherein the pivotable part is disposed so as to be pivotable about a bolt mounted in the tension element in the longitudinal direction of the rail.

9. Arrangement as claimed in claim 8, wherein the bolt is attached to the tension element via a ball joint.

10. Arrangement as claimed in claim 1, wherein the suspension comprises a frame-shaped counter bearing which is formed to be arc-shaped in cross-section and is placed from the outside onto the profile head and is screwed to the pivotable part in the mounting position.

11. Arrangement as claimed in claim 10, wherein the profile head delimits the gap on both sides with first web sections which extend outwardly and upwardly in an inclined manner from the longitudinal center plane, and the pivotable part engages into the crimps of the profile head thus formed by the first web sections.

12. Arrangement as claimed in claim 11, wherein the profile head comprises two opposing second web sections which extend downwardly and outwardly as seen in cross-section and which are attached to the first web sections, and comprises third web sections protruding back inwardly in the direction of the vertical longitudinal center plane, which are attached to the second web sections.

13. Arrangement as claimed in claim 1, wherein the profile head delimits the gap on both sides with first web sections which extend outwardly and upwardly in an inclined manner from the longitudinal center plane, and the pivotable part engages into the crimps of the profile head thus formed by the first web sections.

14. Arrangement as claimed in claim 13, wherein the profile head comprises two opposing second web sections which extend downwardly and outwardly as seen in cross-section and which are attached to the first web sections, and comprises third web sections protruding back inwardly in the direction of the vertical longitudinal center plane, which are attached to the second web sections.

15. Arrangement of a suspension and of a rail, in particular for suspending a travel and/or carrier rail of a suspension track, a suspended conveyor or a lifting gear on a travelling mechanism or frame, having a tension element which supports the rail at one end in the region of a profile head by means of a mounting element, said head being substantially c-shaped in cross-section and forming at the top a gap extending along a longitudinal center plane of the rail, wherein the mounting element comprises a pivotable part which can be pivoted with respect to the tension element, the profile head and the pivotable part are dimensioned such that the pivotable part can be inserted through the gap from the outside into the profile head in a pivoting position and can be pivoted into a mounting position in which the pivotable part lies against the profile head from the inside, bridging the gap, wherein the pivotable part is disposed so as to be pivotable about a bolt mounted in the tension element in the longitudinal direction of the rail.

16. Arrangement as claimed in claim 15, wherein the bolt is attached to the tension element via a ball joint.

17. Arrangement as claimed in claim 15, wherein the pivotable part is formed to be arc-shaped in cross-section.

18. Arrangement of a suspension and of a rail, in particular for suspending a travel and/or carrier rail of a suspension track, a suspended conveyor or a lifting gear on a travelling mechanism or frame, having a tension element which supports the rail at one end in the region of a profile head by means of a mounting element, said head being substantially c-shaped in cross-section and forming at the top a gap extending along a longitudinal center plane of the rail, wherein the mounting element comprises a pivotable part which can be pivoted with respect to the tension element, the profile head and the pivotable part are dimensioned such that the pivotable part can be inserted through the gap from the outside into the profile head in a pivoting position and can be pivoted into a mounting position in which the pivotable part lies against the profile head from the inside, bridging the gap, wherein the profile head delimits the gap on both sides with first web sections which extend outwardly and upwardly in an inclined manner from the longitudinal center plane, and the pivotable part engages into the crimps of the profile head thus formed by the first web sections.

19. Arrangement as claimed in claim 18, wherein the profile head comprises two opposing second web sections which extend downwardly and outwardly as seen in cross-section and which are attached to the first web sections, and comprises third web sections protruding back inwardly in the direction of the vertical longitudinal center plane, which are attached to the second web sections.

\* \* \* \* \*